(12) United States Patent
Holland et al.

(10) Patent No.: US 9,678,984 B2
(45) Date of Patent: Jun. 13, 2017

(54) FILE ACCESS FOR APPLICATIONS DEPLOYED IN A CLOUD ENVIRONMENT

(75) Inventors: Yaron Holland, Hod Hasharon (IL); Amir Jerbi, Givatayim (IL); Avi Kessel, Holon (IL); Shalom Shimoni, Lezion (IL)

(73) Assignee: CA, INC., Islandia, NY (US)

( * ) Notice: Subject to any disclaimer, the term of this patent is extended or adjusted under 35 U.S.C. 154(b) by 369 days.

(21) Appl. No.: 13/605,442

(22) Filed: Sep. 6, 2012

(65) Prior Publication Data

US 2014/0067864 A1    Mar. 6, 2014

(51) Int. Cl.
*G06F 17/30* (2006.01)

(52) U.S. Cl.
CPC ................ *G06F 17/30233* (2013.01)

(58) Field of Classification Search
CPC ........... G06F 17/30094; G06F 17/3012; G06F 17/30126; G06F 17/30165; G06F 17/30174
See application file for complete search history.

(56) References Cited

U.S. PATENT DOCUMENTS

| 6,640,248 B1* | 10/2003 | Jorgensen | 709/226 |
| 7,363,582 B2* | 4/2008 | Sylthe et al. | 715/234 |
| 2010/0287219 A1* | 11/2010 | Caso et al. | 707/827 |

* cited by examiner

*Primary Examiner* — Tyler Torgrimson
(74) *Attorney, Agent, or Firm* — Sage Patent Group (57) ABSTRACT

A method of operating a virtual computer system including a file access interceptor and multiple virtual machines that are logically arranged in a virtualization environment that is managed by a virtualization environment manager is provided. The method includes reading file settings definitions that include identifications and properties of files that are configured to be accessed by a computer application, replacing operations of a file interface in the computer application using with file access interceptor operations that use the file settings to decouple file attributes from the computer application, managing file access via the file access interceptor operations to provide data file storage and read access to the files, and synchronizing file actions in each of a plurality of instances of the files. Related systems and computer program products are disclosed.

24 Claims, 6 Drawing Sheets

FILE ACCESS FOR APPLICATIONS DEPLOYED IN A CLOUD ENVIRONMENT

BACKGROUND

The present disclosure relates to computer systems, and in particular to managing file access to applications that are deployed in a virtualized computer environment.

Virtualized computer environments, which may include cloud computing systems, composite information technology systems and computer cluster systems, are used to provide computer resources or other computing resources to end users. In a cloud computing environment, the physical hardware configuration is hidden from the end user. Cloud computing systems may include servers, network storage devices, routers, gateways, communication links, software (e.g., applications, operating systems, web services, etc.), and other devices. However, because the physical hardware and software platforms on which cloud computing system is implemented are hidden within a "cloud," they can be managed, upgraded, replaced or otherwise changed by a system administrator without the customer being aware of or affected by the change.

A computer cluster, also referred to as a cluster, may be considered as a type of cloud computing environment and may include a set of loosely connected computers that may be connected to one another via local networks.

In a typical cloud computing environment, applications may be executed on virtual machines or appliances, which are guest operating systems installed within a host system and an optional preset configuration and structure (e.g., combination of operating system and web server). Virtual Machines are typically implemented with either software emulation or hardware virtualization, or both. A single hardware and/or software platform may host a number of virtual machines, each of which may have access to some portion of the platform's resources, such as processing resources, storage resources, etc.

Because different applications that are deployed in a cloud computing environment may require access to files, such files may not be consistent among the different applications and/or instances of applications unless a shared location is provided, which may impose unwanted additional complexity to the installation and maintenance of the application. Additionally, unexpected outcomes may occur in the event that two different applications and/or instances of applications access the same file in an overlapping time period. Yet further, synchronization of files used by more than one application and/or instance may be problematic in a cloud computing environment.

BRIEF SUMMARY

Some embodiments herein include a computer system that includes a file access interceptor that replaces a file interface operation of a computer application with a replacement operation corresponding to a data source that the computer application is configured to access. In some embodiments, the replacement operation may include a replacement file operation and the data source may include a file that the computer application is configured to access. Systems may further include a file access connector that is configured to connect a cloud access control manager to the file access interceptor coordinate multiple instances of the file. As used herein, the cloud access control manager may include an access control manager that may be used in a computing cluster as well as other virtualized computer environments or types of virtualized computer environments.

The file interface interceptor may be configured to receive an interceptor definition from the computer application and to generate the replacement operation based on the interceptor definition. In some embodiments, the file interface interceptor may be configured to receive a file request from the computer application and to generate the replacement operation based on the file request. The file request may include multiple file settings corresponding to the file that the computer application is configured to access. Some embodiments provide that the file settings may be interceptor definitions that may be stored in a file, database, the cluster/cloud management system or any combination thereof. The interceptor definitions may depend on how the system is installed or implemented. The file may include a database file and the file settings include query parameters corresponding to a query that is configured to be submitted or read to or from the database. The file settings may include file source data that identifies the file.

The file access interceptor may be further configured to receive multiple file settings or interceptor definitions corresponding to the file and to determine replacement file settings or interceptor definitions that correspond to a replacement instance of the file that is implemented in a distributed computing environment. The replacement operations may be performed using the replacement file settings or interceptor definitions. The file access interceptor may supplement operations of the file interface operation in the computer application responsive to multiple file settings or interceptor definitions.

Some embodiments include a file settings module that is configured to maintain the file settings that are configured to be used by the file access interceptor. The file settings may include location data that identifies a storage location of files.

The system may further include multiple managed machines that each include a respective file access interceptor that replaces a respective file interface operation of a respective computer application with a respective replacement operation corresponding to access to the file. The file access interceptor may be further configured to synchronize file actions corresponding to the access by any of the computer applications via the cloud access control manager and the file access connector. The file access interceptor may be further configured to include a priority module that is configured to generate priority data that corresponds to determining which of the respective computer applications has priority to access the file. In some embodiments, the file access interceptor is configured to provide the file in one instance and the priority module is configured to deny other ones of the computer applications access to the file when another one of the computer applications is accessing the file. The priority data may be a rule based determination that is based on at least one rule that is defined prior to a corresponding file access request.

The access interceptor may be configured to provide a respective file instance for each of the respective computer applications and to synchronize file actions in the respective file instances corresponding to access by any of the computer applications via the cloud access control manager and the file access connector.

Some embodiments of the present inventive concept include methods of operating a computer system. Such methods may include reading file settings definitions that include identifications and properties of files that are configured to be accessed by a computer application, replacing operations of a file interface in the computer application using with file access interceptor operations that are configured to use the file settings to decouple file attributes from the computer application, managing file access via the file access interceptor operations to provide data file storage and read access to the files, and synchronizing file actions in each of a plurality of instances of the files.

Replacing operations of the file interface may include receiving a file access request from the computer application and generating a replacement file access request that is configured to provide the computer application with access to the file. The file access request may include file access parameters that identify a portion of the file and the replacement file access request includes the file access parameters.

Some embodiments include generating priority data that determines a priority computer application of a plurality of the computer applications on a plurality of managed machines, the priority computer application configured to access the file responsive to the file access request via the file access interceptor. The priority data may be rule-based and file access requests from ones of the plurality of computer applications other than the priority computer application are denied.

Some embodiments of the inventive concept include computer program products for operating a computer system including a plurality of managed machines that use resources of the computer system. The computer program products may include a computer readable storage medium having computer readable program code embodied in the medium. The computer readable program code includes computer readable program code configured to replace a file interface operation of a computer application with a replacement operation corresponding to a file that the computer application is configured to access, and computer readable program code configured to connect a cloud access control manager to the file access interceptor to synchronize multiple instances of the file.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
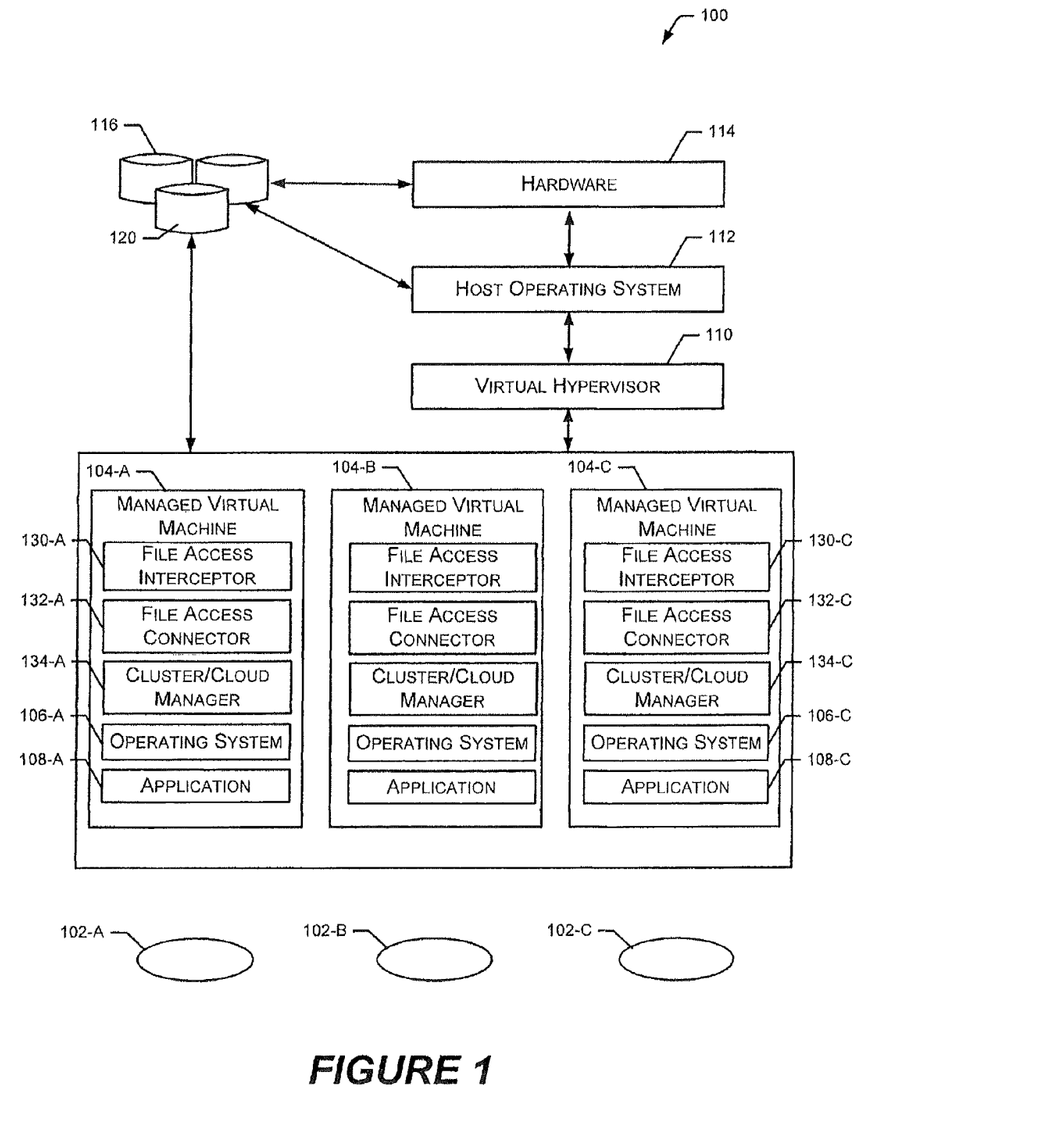
FIG. 1 is a block diagram of a computing system that supports a virtual operating environment according to an embodiment of the present inventive subject matter.

FIG. 1 illustrates a computer system 100 for a virtualized computing environment in which the subject matter of the present disclosure can be embodied. Although various embodiments are described in the context of a virtualized computing environment, the disclosure is not limited thereto and may be used to manage access to resources of non-virtual computer environments. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the managed machines 104. A virtual hypervisor 110 can provide an interface between the managed machines 104 and a host operating system 112 and allow multiple guest operating systems 106 and associated applications 108 to run concurrently. The host operating system 112 handles the operations of a hardware platform 114 capable of implementing managed machines 104. A data storage space 116 may be accessed by the host operating system 112 and is connected to the hardware platform 114.

The hardware platform 114 generally refers to any computer system capable of implementing managed machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the managed machine 104 and the hardware platform 114 through the host operating system 112. The virtual hypervisor 110 virtualizes the computer system resources and facilitates the operation of the managed machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the managed machines 104 present a virtualized environment to the guest operating systems 106, which in turn provide an operating environment for applications 108 and other software constructs.

Applications 108 that are implemented on the managed machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

While in a local implementation, an application 108 may include a default or designated and/or relative location or file path for accessing a file. However, when implemented in a cloud or cluster environment, such location or path may be incorrect or otherwise unusable. Additionally, a file may be used by more than one application 104 and/or instance thereof.

Accessing the file(s) may be performed by an application using a file interface that may be a component in the application 104 and/or an externally configured module that is provided to function with the application 104. Since a file interface may not be configured to access files or other types of data sources when the application 104 is installed in a cloud or cluster, a file access interceptor 130 may intercept operations presented via a file interface and replace the file interface operations with one or more replacement operations that correspond to an actual configuration of the data source. Replacement operations may include synchronizing operations, database read operations, database write operations and file operations, among others. In some embodiments, a file access interceptor 130 may replace an implementation of a file interface while in some other embodiments the file access interceptor 130 may supplement the file interface. The file access interceptor 130 may be implemented entirely hardware, entirely software (including firmware, resident software, micro-code, etc.) or combining software and hardware implementation that may be referred to as a circuit, module, and/or component.

The implementation of the file access interceptor 130 may depend on properties of a target environment. For example, in JAVA, a layer may be added to the cloud that replaces the different file access operations with the file access interceptor 130. In other implementations, a file access interceptor 130 may be committed to the cloud or cluster and may be configured to receive the requests generated by the application 104 and/or file interface via a message engine within the cloud or cluster.

File operations that are replaced using the file access interceptor may include any type of operation in which the application relies on access to an external file. For example, a read request that includes file path or location information relative to the application 104 and that may be sent via a file interface may be intercepted by a file access interceptor 130. The file access interceptor 130 may generate a replacement read request including the actual file path or location of the requested file. In addition to revised file path or location information, the replacement read request may include other parameters that are determined by settings provided by the application 104. For example, query data, file format, file usage data, file access logging, encryption data, security data, access privilege data, and/or authentication data, among others may be included.

In some embodiments, a file that is configured to be accessed by more than one application may be provided in a single instance. In such embodiments, the file access interceptor may be configured to include access priority data that determines access priority between different applications 104 that request access to the same file. In some embodiments, the access priority may be provided by one or more settings provided via the application 104 or from a developer. The settings may include rule based settings that define the access priority based on priority of the requesting application 104, priority of the type of file access operation, predicted duration of file access and/or priority based on order of requests from the applications 104.

Some embodiments provide that a file is configured to be accessed by more than one application may be provided in multiple instances. In such embodiments, a file access connector 132 may be configured to connect a cloud access control manager 134 (cloud/cluster manager) to synchronize file actions in the cluster or cloud. The file access connector 132 may be implemented entirely hardware, entirely software (including firmware, resident software, micro-code, etc.) or combining software and hardware implementation that may be referred to as a circuit, module, and/or component.

The cloud access control manager 134 may be configured to manage access to the various resources in the cluster or cloud. In this manner, applications 104 may be configured to access the same files without the need for a physical shared hard disk or other physically implemented storage.

Figure 2:
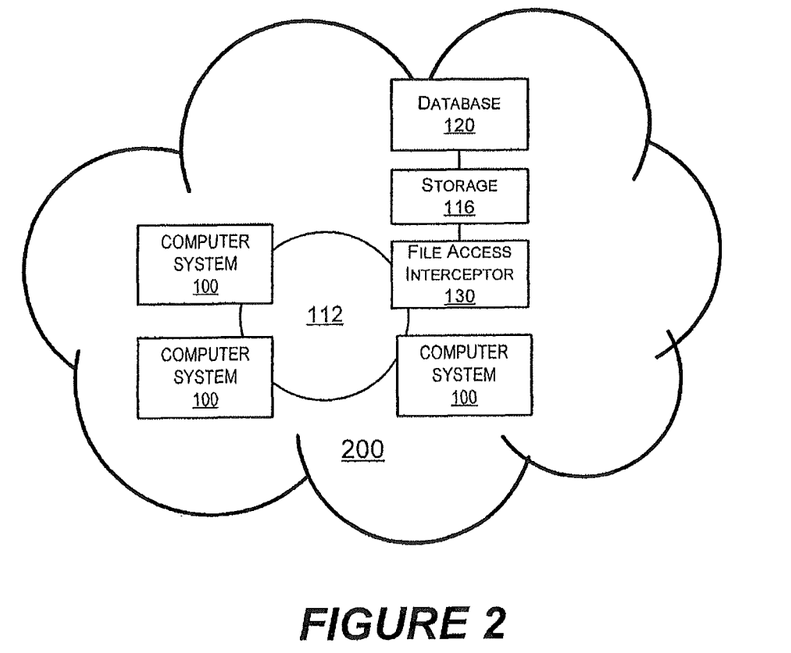
FIG. 2 illustrates a virtual computing environment according to an embodiment of the present inventive subject matter.

Reference is now made to FIG. 2, which illustrates a virtual computing environment according to some embodiments of the present inventive concepts. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 2 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

Virtual machines within a same cluster or virtualization environment can be managed by a single virtualization environment manager to have same or similar resource access privileges (e.g., processor utilization, priority, memory allocation, communication interface access privileges, etc.), while virtual machines within different clusters or virtualization environments can have different resource access privileges. For example, one or more servers 100 may be implemented in a cluster or virtualization environment using a single file access interceptor 130 or multiple file access interceptors 130.

Virtual machines 104 that are deployed within a virtualization environment may share physical resources within a server 100. For example, virtual machines 104 may share physical data storage 116, a database 120 communication facilities and other resources or services of a server 100. Conflicts between applications 108 of different virtual machines 104 seeking access to file resources, such as a particular file, may be resolved by the file access interceptor 130.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines. These tools may further be used to implement systems/methods according to some embodiments described herein.

When deploying a new application 108 in a virtualization environment, or when modifying an application 108 in a virtualization environment, systems/methods according to some embodiments may be implemented with the new or modified application 108 without making any code changes to the application 108 corresponding to requirements associated with a cloud or cluster implementation. In this manner, the application 108 may be deployed in a cloud or cluster even in the circumstance that there are modules that use file that are incapable of modification.

Additionally, systems/methods according to some embodiments may be deployed in conjunction with existing applications 108 without the need for any code or configuration changes to the existing applications 108. For example, systems/methods herein may enable usages of a file interface without additional code to address requirements associated with a cloud or cluster implementation.

Figure 3:
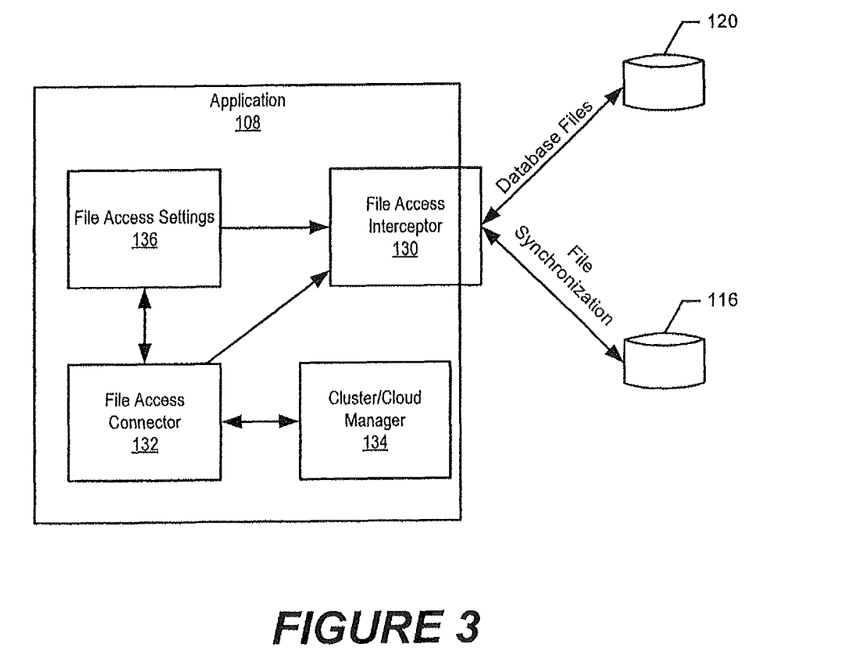
FIG. 3 illustrates a system according an embodiment of the present inventive subject matter including an application and a file access interceptor.

Reference is now made to FIG. 3, which is a block diagram illustrating a system according to some embodiments including an application and a file access interceptor. The application 108 may be configured to access one or more files that may be provided in different contexts, instances and/or configurations when the application 108 is deployed in a cloud or cluster. While typically, the application 108 may include or use a file interface to access such files, when deployed in the cloud or cluster, the file interface as originally configured may not provide complete functionality. As such, a file access interceptor 130 may replace file interface operations with replacement file interface operations. For example, the file interface interceptor 130 may be configured to receive a file request generated by the application 108 and to generate the replacement file operation based on the file request. In some embodiments, the file request from the application 108 may include one or more file access settings 136 (also referred to as file settings) corresponding to the file that is the object of the file request.

In some embodiments, the file may include a database file that may be retrieved from a database 120. In such embodiments, the file access settings 136 may include query parameters corresponding to a query included in the file request. For example, query parameters may include field identifiers and/or data or data ranges corresponding to one or more fields in a database 120. In some embodiments, the file settings may include file source data that identifies the file. For example, a file request may include an absolute or relative path identifier or name for accessing the file. A file request may further include logical and/or physical storage location identifiers including device and volume identifiers, version information, module identifiers, etc. As such, the file access settings may include information that determines which files and/or groups of files to access and how such files are configured to be used with the application 108.

Some embodiments provide that the file access interceptor 130 receives a file access settings 136 and determines replacement file settings that correspond to a replacement instance of the file that is implemented in the cloud or cluster. In such embodiments, the replacement file operation is performed using the replacement file settings.

Although illustrated as being integrated with the application 108, the file access interceptor may be deployed as a separate module from the application 108. Similarly, a file access settings module 136 may be integrated with the application 108 and/or may be deployed as a separate module from the application 108.

Some embodiments include a file access connector 132 that is configured to connect a cloud access control manager 134 to the file access interceptor 130 to coordinate multiple instances of the file. In this regard, the file access interceptor 130 may synchronize file actions corresponding to the access by any other applications 108 via the cloud access control manager 134 and the file access connector 132.

In some embodiments, multiple different applications 108 may attempt to access a single instance of one or more files. In such embodiments, the file access interceptor 130 may include a priority module that is configured to generate priority data that may be used to determine which of the applications 108 has file access priority. For example, some embodiments provide that the priority module is configured to deny subsequent attempts to access a file when another application 108 is accessing the file. The priority data may include rule based logic that may be determined or configured prior to a file access request. For example, in some embodiments, rules may include default rules that determine priority based on the order of access requests, the type of the requesting application 108, a file operation type, a predetermined priority level, and/or an estimated file access duration, among others. For example, a low priority computer application may have a lower priority than a high priority computer application. The low priority computer application may pause an operation during an access to the data source by the high priority computer application. Some other embodiments provide that the rules may be determined as a deployment operation corresponding to the application 108 and/or the systems/methods disclosed herein.

Figure 4:
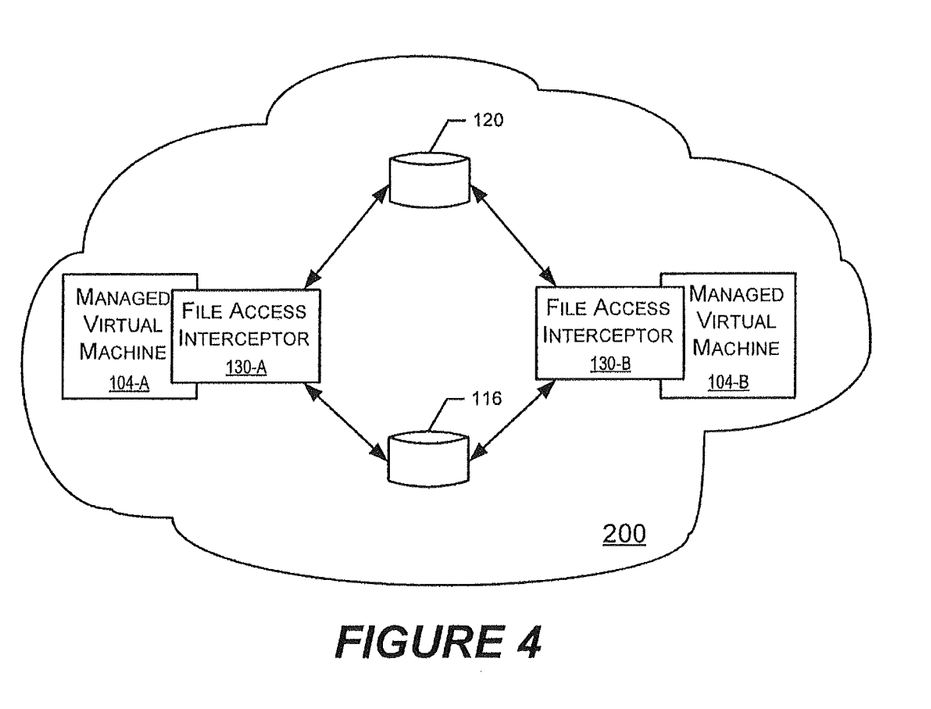
FIG. 4 illustrates a cloud computing environment including multiple managed virtual machines with file access interceptors according to an embodiment of the present inventive subject matter.

Brief reference is now made to FIG. 4, which illustrates a cloud computing environment including multiple Managed virtual machines with file access interceptors according to some embodiments of the present inventive concepts. As illustrated, multiple ones of managed virtual machines 104 may be implemented in a cloud 200. Some embodiments provide that each of the managed virtual machines 104 may include or correspond to a file access interceptor 130 that is configured to provide file access operations for applications that are deployed with the managed virtual machines 104 in the cloud 200. The file access interceptors 130 may be operable to provide file access operations corresponding to files that are deployed in the cloud 200. For example, files deployed in the cloud may be deployed within a data storage 116 and/or a database 120, among others. Although illustrated as being separately deployed, the database 120 and the data storage 116 may be provided on the same physical and/or logical devices. Additionally, although each of the database 120 and the data storage 116 is shown as a single instance, each may be deployed in one or more different physical and/or logical devices.

Figure 5:
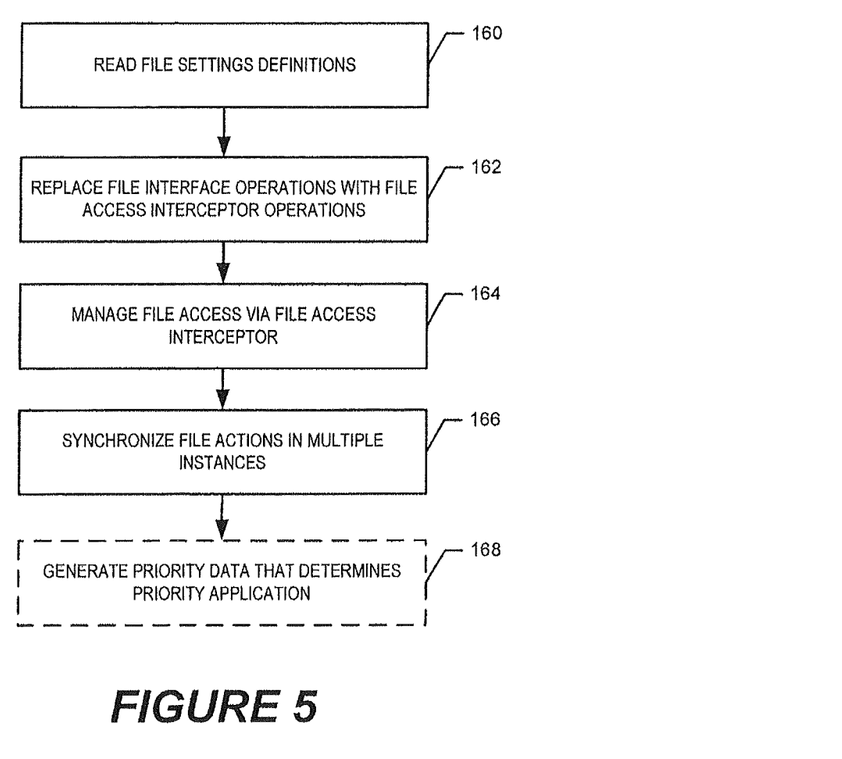
FIG. 5 is a flowchart illustrating operations for systems/methods according to an embodiment of the present inventive subject matter.

Reference is now made to FIG. 5, which is a flowchart illustrating operations for providing systems/methods according to some embodiments disclosed herein. File settings definitions that correspond to files to be accessed by an application may be read (block 160). The file settings definitions may include identifications and/or properties corresponding to the file(s) to be accessed. For example, file path and/or location information may be read to determine a file location that the application is configured to use. File types, file names, volumes, versions, modules, priority data, synchronization data and query terms may be included in the file setting definitions. The file settings definitions may correspond to data used by a file interface that the application would use in a non-cloud deployed circumstance.

File interface operations in the application may be replaced with file access interceptor operations (block 162). The file access interceptor operations may serve to decouple attributes of files that are deployed in the cloud from applications that are configured to access the files. For example, some embodiments provide that the file access interceptor operations replace the file interface operations without changing the applications. File access is managed via the file access interceptor operations (block 164). For example, data file storage and/or read access to file in a cloud deployment may be managed for the application via the file access interceptor operations.

Figure 6:
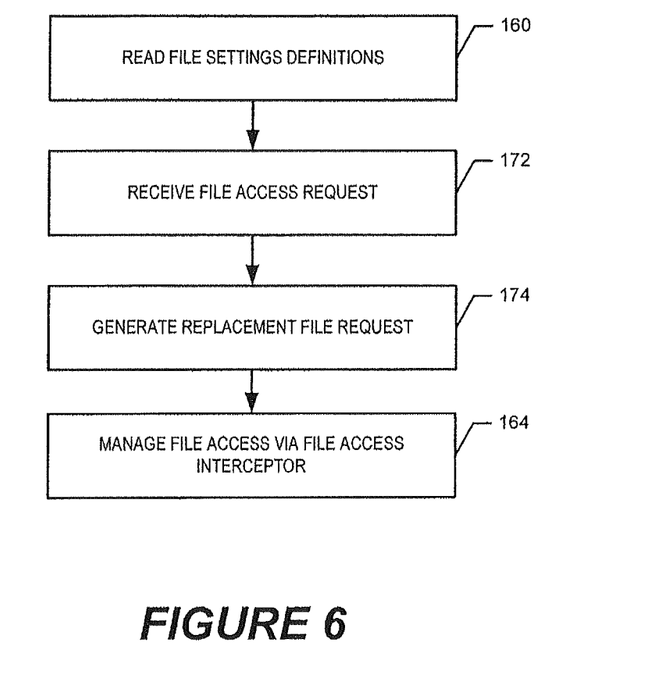
FIG. 6 is a flowchart illustrating operations for systems/methods according to an embodiment of the present inventive subject matter.

Brief reference is now made to FIG. 6, which is a flowchart illustrating operations for systems/methods according to some other embodiments. As discussed above regarding FIG. 5, file settings definitions that correspond to files to be accessed by an application may be read (block 160). A file access request may be received (block 172). The file request may include query parameters, field identifiers, field data, data ranges, file source data, a local memory storage address, an absolute or relative path identifier or name, logical and/or physical storage location identifiers, device identifiers, volume identifiers, version information, and/or module identifiers, among others. A replacement file request may be generated (block 174). The replacement file request may include corresponding query parameters, field identifiers, field data, data ranges, file source data, a network memory storage address, an absolute or relative path identifier or name, logical and/or physical storage location identifiers, device identifiers, volume identifiers, version information, and/or module identifiers, among others. File access is managed via the file access interceptor operations (block 164).

Figure 7:
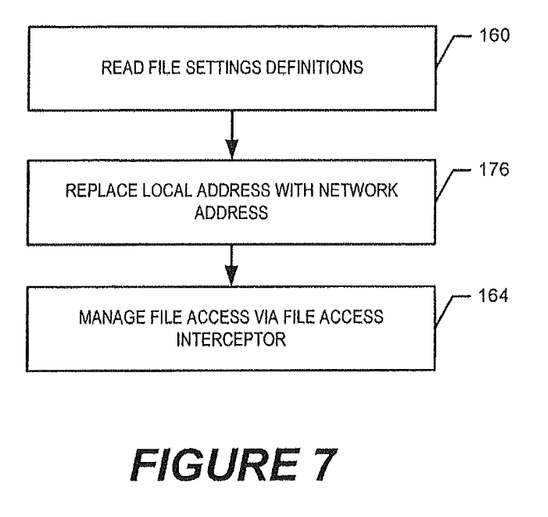
FIG. 7 is a flowchart illustrating operations for systems/methods according to an embodiment of the present inventive subject matter.

Brief reference is now made to FIG. 7, which is a flowchart illustrating operations for systems/methods according to some other embodiments. As discussed above regarding FIGS. 5 and 6, file settings definitions that correspond to files to be accessed by an application may be read (block 160). A local memory address may be replaced with a network address (block 176). In some embodiments, the local memory address may be associated with a file interface operation of the application. The local memory address may correspond to a local memory address that the application would otherwise use to access the file in a non-cloud deployment thereof. The network address may be associated with a replacement file operation and may identify a location of the file in a networked memory device when the application and/or the file is deployed in the cloud. The local memory address and/or the network address may include or be represented by a uniform resource locator (URL) identifier. File access is managed via the file access interceptor operations (block 164).

Some embodiments include cloud deployments in which multiple instances of files access by different application may be provided. In such cases, file actions may be synchronized in each of the multiple instances of the files (block 166). Other deployments may include a file that is provided in a single instance but is configured to be access by multiple different applications. In the circumstance that multiple applications may attempt access to the same file at the same time, priority data may be generated (block 168). In some embodiments, the priority data may determine a priority application among multiple applications that may be deployed on multiple managed machines. The priority application may access the file responsive to a file access request via a file access interceptor operation. Some embodiments provide that the priority data is rule-based and that non-priority applications may be denied access to the file.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of operating a computer system, the method comprising:
    reading file settings definitions that comprise identifications and properties of files that are configured to be accessed by a computer application;
    replacing operations of a file interface in the computer application with file access interceptor operations that use the file settings to provide access to the files without file attributes in the computer application;
    managing file access via the file access interceptor operations to provide data file storage and read access to the files; and
    synchronizing file actions in each of a plurality of instances of the files,
    wherein replacing operations of the file interface comprises:
        receiving a file access request from the computer application; and
        generating a replacement file access request that provides the computer application with access to the file,
            wherein the file comprises a database file that includes data elements stored therein and that is used by a database application that operates using the database file, and
            wherein the file access request comprises file access parameters that identify a portion of the database file to be retrieved without retrieving other portions of the database file,
        wherein the file access interceptor receives an interceptor definition from the computer application and generates the replacement operation based on the interceptor definition,
        wherein the interceptor definition corresponds to a file request, and
        wherein the file request comprises a plurality of file settings corresponding to the data source that the computer application is configured to access.

2. The method according to claim 1, wherein the replacement file access request comprises the file access parameters.

3. The method according to claim 1, wherein replacing operations of the file interface comprises replacing a local memory storage address that is associated with the operations of the file interface with a network address that is associated with file access interceptor operations.

4. The method according to claim 3, wherein the network address includes a uniform resource locator (URL) identifier.

5. The method according to claim 3, wherein replacing the local memory storage address with the network address comprises determining the network storage address using a mapping of local memory storage addresses and the network addresses.

6. The method according to claim 1, further comprising:
    generating priority data that determines a priority computer application of a plurality of the computer applications on a plurality of managed machines,
    wherein the priority computer application accesses the file responsive to the file access request via the file access interceptor.

7. The method according to claim 1, wherein the priority data is rule-based and wherein file access requests from ones of the plurality of computer applications other than the priority computer application are denied.

8. The method according to claim 1, wherein the replacing operations of the file interface in the computer application with file access interceptor operations includes performing a plurality of mirror operations in a plurality of instances of files that are configured to be accessed by the computer application.

9. A computer program product for operating a computer system including a plurality of managed machines that use resources of the computer system, the computer program product comprising:
    a non-transitory computer readable storage medium having computer readable program code embodied in the medium, the computer readable program code comprising:
    computer readable program code configured to replace a file interface operation of a computer application with a replacement operation corresponding to a data source that the computer application is configured to access; and
    computer readable program code configured to connect a cloud access control manager to the file access interceptor to synchronize multiple instances of the data source,
    wherein the computer readable program code configured to replace the file interface operation include computer readable program code to receive a file access request from the computer application and generate a replacement file access request that provides the computer application with access to the file, wherein the file access request comprises file access parameters that identify a portion of the file to be retrieved without retrieving other portions of the file, wherein the file comprises a database file that includes data elements stored therein and that is used by a database application that operates using the database file, wherein the file access interceptor receives an interceptor definition from the computer application and generates the replacement operation based on the interceptor definition, wherein the interceptor definition corresponds to a file request, and wherein the file request comprises a plurality of file settings corresponding to the data source that the computer application is configured to access.

10. A computer system, comprising:
a processor;
a file access interceptor that, when executed by the processor, replaces a file interface operation of a computer application with a replacement operation corresponding to a data source that the computer application is configured to access; and
a file access connector that, when executed by the processor, connects a cloud access control manager to the file access interceptor to coordinate multiple instances of the data source,
wherein the data source that the computer application is configured to access comprises a database file that includes data elements stored therein that exclude the database file as a data element and that is used by a database application that operates using the database file,
wherein the replacement operation includes a file request to the database file, the file request including a plurality of file settings that include query parameters corresponding to a query that is configured to be submitted to the database file,
wherein the query parameters include data ranges corresponding to a field in the database file,
wherein the file access interceptor receives an interceptor definition from the computer application and generates the replacement operation based on the interceptor definition,
wherein the interceptor definition corresponds to a file request, and
wherein the file request comprises a plurality of file settings corresponding to the data source that the computer application is configured to access.

11. The computer system according to claim 10, wherein the plurality of file settings include file source data that identifies the data source that the computer application is configured to access.

12. The computer system according to claim 10, wherein the file access interceptor replaces a local memory storage address that is associated with the file interface operation with a network address that is associated with the replacement operation and that identifies a location of the data source in a networked memory device.

13. The computer system according to claim 12, wherein the network address includes a uniform resource locator (URL) identifier.

14. The computer system according to claim 10, wherein the file access interceptor receives a plurality of file settings corresponding to the data source that the computer application is configured to access and determines replacement file settings that correspond to a replacement instance of the data source that is implemented in a distributed computing environment.

15. The computer system according to claim 14, wherein the replacement operation is performed using the replacement file settings.

16. The computer system according to claim 10, wherein the file access interceptor supplements operations of the file interface operation in the computer application responsive to a plurality of file settings.

17. The computer system according to claim 10, further comprising a file settings module that maintains the file settings that are configured to be used by the file access interceptor.

18. The computer system according to claim 17, wherein the file settings include location data that identifies a storage location of files, and wherein the location data includes a directory.

19. A computer system, comprising:
a processor;
a file access interceptor that, when executed by the processor, replaces a file interface operation of a computer application with a replacement operation corresponding to a data source that the computer application is configured to access;
a file access connector that, when executed by the processor, connects a cloud access control manager to the file access interceptor to coordinate multiple instances of the data source; and
a plurality of managed machines, each of the managed machines comprises a respective file access interceptor that replaces a respective file interface operation of a respective computer application with a respective replacement operation corresponding to access to the data source that the respective computer application is configured to access,
wherein the data source that the computer application is configured to access comprises a database file that includes data elements stored therein that exclude the database file as a data element and that is used by a database application that operates using the database file,
wherein the replacement operation includes a file request to the database file, the file request including a plurality of file settings that include query parameters corresponding to a query that is configured to be submitted to the database file,
wherein the query parameters include data ranges corresponding to a field in the database file, and
wherein the file access interceptor includes a priority module that generates priority data that corresponds to a determination of which of the respective computer applications has priority to access the data source.

20. The computer system according to claim 19, wherein the file access interceptor synchronizes file actions corresponding to the access by any of the computer applications via the cloud access control manager and the file access connector.

21. The computer system according to claim 19, wherein the file access interceptor provides the data source and the priority module denies other ones of the computer applications access to the data source when another one of the computer applications is accessing the data source.

22. The computer system according to claim 19, wherein the priority data is rule based on at least one rule that is defined prior to a corresponding file access request.

23. The computer system according to claim 19, wherein the priority module provides data specifying an order of data access to respective computer applications, and     wherein a low priority computer application having a lower priority pauses an operation thereby during an access to the data source by a high priority computer application having a higher priority than the low priority computer application.

24. The computer system according to claim 19, wherein the file access interceptor provides a respective file instance for each of respective computer applications and synchronizes file actions in the respective file instances corresponding to access by any of the computer applications via the cloud access control manager and the file access connector.

\* \* \* \* \*